United States Patent [19]
Shimada et al.

[11] Patent Number: 5,297,229
[45] Date of Patent: Mar. 22, 1994

[54] SYSTEM FOR EXTENDING COMMUNICATION EQUIPMENT USING FLAT COAXIAL CABLE

[75] Inventors: Shozo Shimada; Tomoyuki Hongoh; Tetsuya Takahashi, all of Kawasaki, Japan

[73] Assignee: Fujitsu Limited, Kanagawa, Japan

[21] Appl. No.: 36,408

[22] Filed: Mar. 24, 1993

[30] Foreign Application Priority Data

Mar. 26, 1992 [JP] Japan .................. 4-068470

[51] Int. Cl.$^5$ ............................................. G02B 6/00
[52] U.S. Cl. ........................................ 385/135; 385/137
[58] Field of Search .............................. 385/135-139

[56] References Cited
U.S. PATENT DOCUMENTS

| | | | |
|---|---|---|---|
| 4,630,886 | 12/1986 | Lauriello et al. | 385/135 |
| 4,818,054 | 4/1989 | George et al. | 385/135 |
| 5,129,030 | 7/1992 | Petrunia | 385/135 |
| 5,138,688 | 8/1992 | Debortoli | 385/135 |

Primary Examiner—John D. Lee
Assistant Examiner—Phan Thi Heartney
Attorney, Agent, or Firm—Armstrong, Westerman, Hattori, McLeland, & Naughton

[57] ABSTRACT

A system for extending communication equipment using flat coaxial cables, the system occupying a minimum installation space and providing equipment extensions and interface changes in a flexible manner. The system comprises a rack carrying a base shelf and at least one extension shelf. The base shelf has a plurality of base PWB assemblies inserted therein, and the extension shelf accommodates a plurality of extension PWB assemblies. One end of a flat coaxial cable bundle is attached removably to the front of each base PWB assembly. With its extra length portion left in a first tray on the base shelf, the flat coaxial cable bundle passes through the tray from front to back to enter a second tray from its back on the extension shelf. With another extra length portion left in the second tray, the flat coaxial cable bundle leaves the front end of the second tray to connect detachably to the front of each extension PWB assembly.

6 Claims, 11 Drawing Sheets

SYSTEM FOR EXTENDING COMMUNICATION EQUIPMENT USING FLAT COAXIAL CABLE

BACKGROUND OF THE INVENTION

1. Field of the Invention

The present invention relates to a system for extending communication equipment. More particularly, the invention relates to a system for extending communication equipment using flat coaxial cables, the system dealing flexibly with making extensions and interface changes to the equipment.

2. Description of the Related Art

Today, there exist communication equipment extension systems that are used to make optical channel extensions and interface changes to optical communication equipment. Typically, the extension system is interposed between exchange and transmitter or between transmitters of an optical communication system, providing the necessary extensions without hampering overall optical circuit controls such as selection, changing, switching and testing of optical circuits.

There are three kinds of optical transmission trunk systems worldwide: one of Japan, another of North America and another of Europe. Because these systems were developed independently of one another, the digital hierarchy of optical circuit channels differ from region to region. Attempts to unify the digital hierarchies worldwide were launched in recent years, and the individual countries involved began studying ways to attain the unified specifications. In 1988, the CCITT established the Synchronous Digital Hierarchy (SDH). The move was accompanied by the adoption of recommendations for inter-communication network standardization. Thus the stage was set for building optical communication trunk networks unified worldwide.

Conventional systems for extending communication equipment primarily involve replacing printed wiring board assemblies (hereinafter called PWB assemblies) on shelves to accomplish interface changes or equipment extensions. Because it is on the level of PWB assemblies that the conventional communication equipment extension systems provide equipment extensions or interface changes, these systems are incapable of complying flexibly with the universal standard optical trunk communication network.

To set up a new optical communication network requires that the network be extended on the shelf level, that the space occupied the extension system be limited to a minimum, and that interface changes be made on the level of PWB assembly. Until now, at a typical network equipment site, the extension system is disproportionately large compared with the other small-sized communication equipment. The space occupied by the extension system is wasteful and needs to be reduced. Furthermore, the conventional extension system provides extensions and interface changes only on the PWB assembly level. The inflexibility of the system in this respect is a significant disadvantage of the prior art.

SUMMARY OF THE INVENTION

It is therefore an object of the present invention to provide a system for extending communication equipment using flat coaxial cables, the system occupying a minimum installation space and providing equipment extensions and interface changes in a flexible manner.

It is another object of the invention to provide a system for extending communication equipment using flat coaxial cables, the system offering enhanced levels of ease in the execution of extension work as well as in operation and maintenance.

In accordance with an aspect of the present invention, there is provided a communication equipment extension system comprising: a rack; a base shelf mounted on the rack, the base shelf having a plurality of base printed wiring board assemblies installed perpendicularly and in parallel with one another; a first tray mounted on the rack above the base shelf; at least one extension shelf mounted on the rack above the first tray, the extension shelf having a plurality of extension printed wiring board assemblies installed perpendicularly and in parallel with one another; a second tray fixed integrally at the top of the extension shelf; and a flat coaxial cable bundle connected detachably to the front side of each of the base printed wiring board assemblies, the flat coaxial cable bundle threading through the first tray from front to back to enter the second tray from the back thereof, extra length portions of the flat coaxial cable bundle being accommodated inside the first tray and the second tray, the flat coaxial cable bundle leaving the front end of the second tray to connect detachably to the front side of each of the extension printed wiring board assemblies.

With this communication equipment extension system, the flat coaxial cable bundles each containing a plurality of flat coaxial cables permits equipment extensions to be made on the shelf level. That is, a large number of PWB assemblies are extended as a whole. The system deals flexibly with the optical communication trunk system while drastically reducing the installation area at the site. Illustratively, the installation area is reduced to $\frac{1}{3}$ to $\frac{1}{4}$ of what is occupied by the comparable prior art extension system.

According to the invention, the first and the second trays are furnished above the base and extension shelves, respectively, so that extra length portions of the flat coaxial cable bundles are accommodated inside the trays. This structure allows the base or extension PWB assemblies to be drawn out extensively in the forward direction from the base or extension shelf for easy execution of line extensions, interface changes or testing.

Because the invention connects the base PWB assemblies with the extension PWB assemblies in special ways using flat coaxial cable bundles, it is easy to draw out the assemblies from their shelf. The system according to the invention thus provides in a flexible manner system-wide extensions and circuit channel changes. Such extensions and changes are carried out easily without circuit disconnection.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENT

Figure 1:
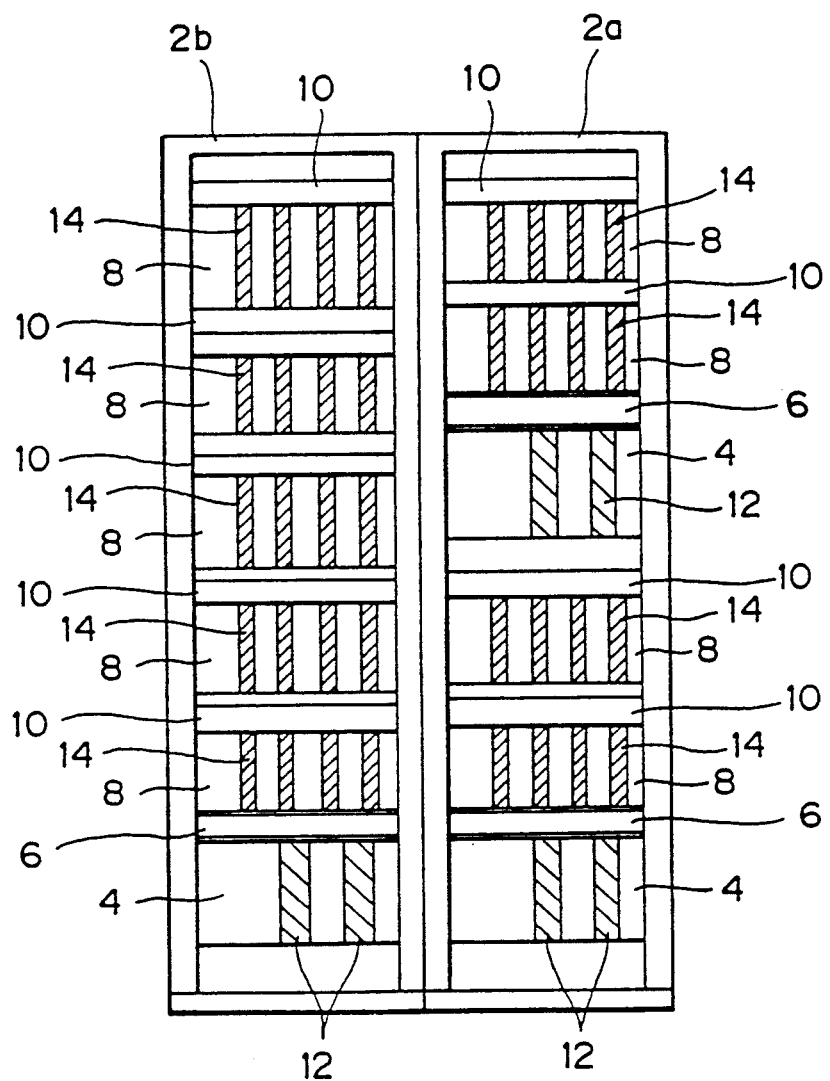
FIG. 1 is a schematic front view of a preferred embodiment of the invention.
Figure 2:
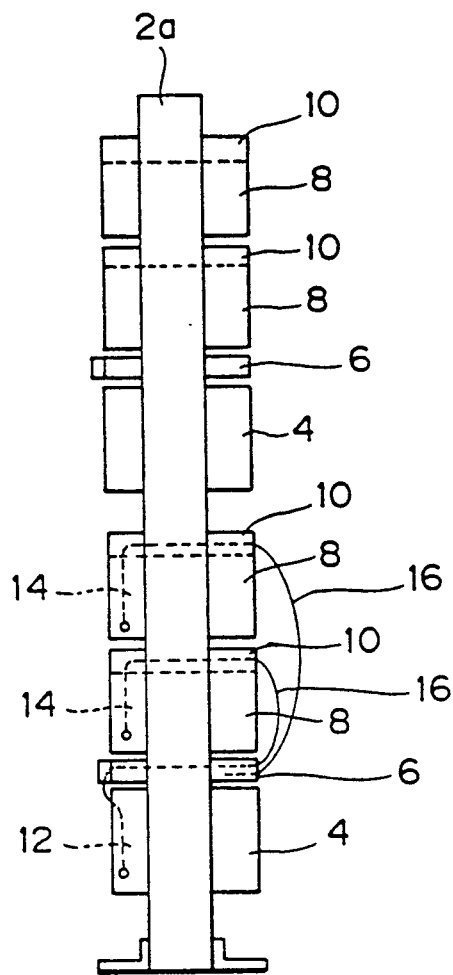
FIG. 2 is a schematic side view of the embodiment.

The preferred embodiment of the invention will now be described with reference to the accompanying drawings. FIGS. 1 and 2 are a schematic front view and a schematic side view of the embodiment, respectively. A rack 2a carries two base shelves 4 accommodating a plurality of base PWB assemblies 12 arranged perpendicularly and in parallel with one another. On top of each base shelf 4 is a cable accommodation tray 6 that accommodates extra length portions of flat coaxial cable bundles 16. Although the cable accommodation tray 6 is separated from the base shelf 4, as shown in FIGS. 1 and 2, the tray 6 and shelf 4 may alternatively be constructed in an integral manner.

Above each cable accommodation tray 6 are two extension shelves 8 that accommodate a plurality of extension PWB assemblies 14 arranged perpendicularly and in parallel with one another. On top of each extension shelf 8, there is integrally furnished a cable accommodation tray 10 that accommodates extra length portions of the flat coaxial cable bundles 16.

Figure 4:
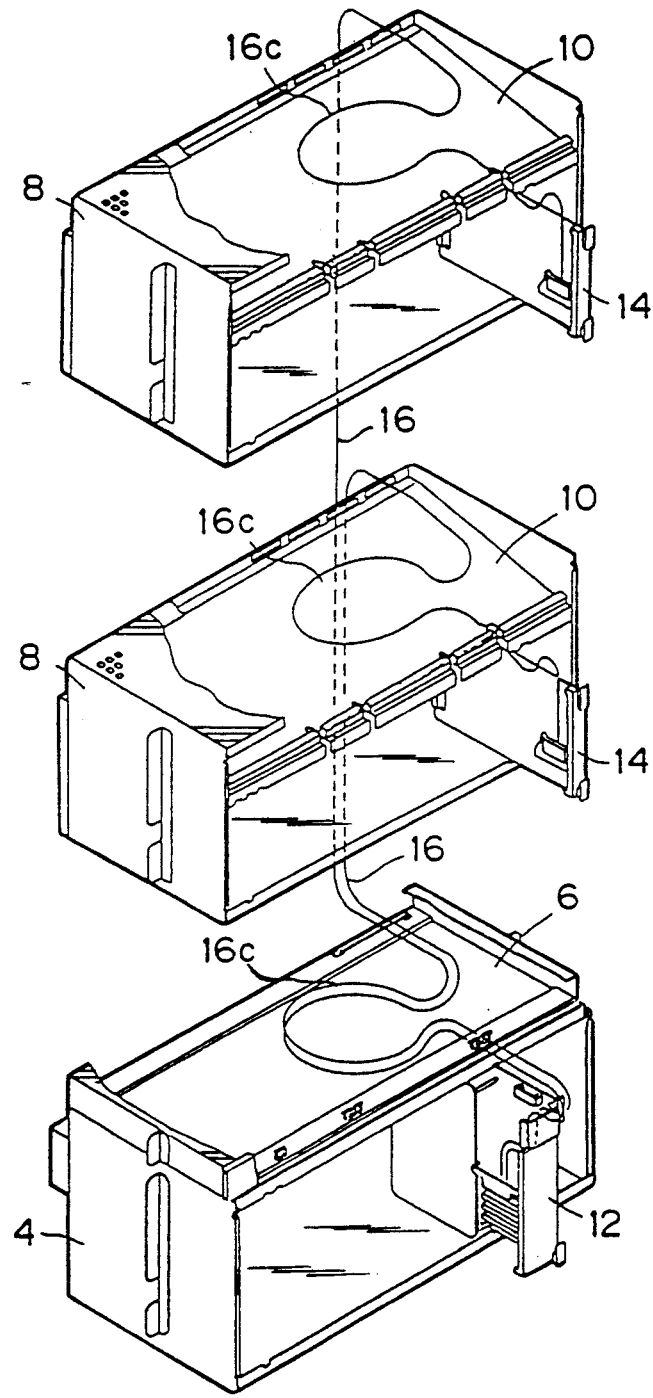
FIG. 4 is an exploded perspective view of the embodiment.

As can be seen from FIGS. 2 and 4, the flat coaxial cable bundle 16 is connected detachably to the front side of each base PWB assembly 12. With its extra length portion 16c held in the cable accommodation tray 6, the flat coaxial cable bundle 16 passes through the tray 6 from front to back. The flat coaxial cable bundle 16 then enters the cable accommodation tray 10 from the back thereof. Leaving another extra length portion 16c inside the cable accommodation tray 10, the flat coaxial cable bundle 16 exits the tray 10 from the front end thereof. The flat coaxial cable bundle 16 from the cable accommodation tray 10 then connects detachably to the front side of each extension PWB assembly 14.

Referring again to FIG. 1, inside the left-hand side rack 2b are five extension shelves 8 on top of one base shelf 4. Depending on the scale of the optical communication system involved, as many racks 2a and 2b as needed are installed in parallel, each rack accommodating the base shelf 4 and extension shelves 8.

Figure 3:
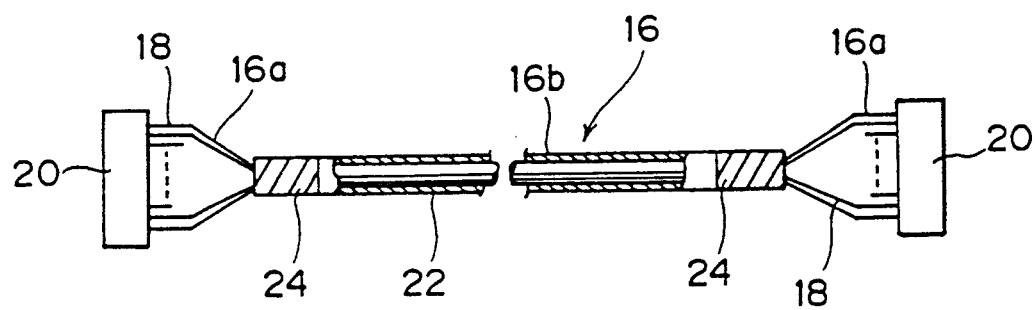
FIG. 3 is a partial cross-sectional view of a flat coaxial cable, bundle for use with the embodiment.

The constitution of the flat coaxial cable bundle 16 will now be described with reference to FIG. 3. A plurality of flat coaxial cables 18 are bundled in a flat shape at both ends thereof to constitute one cable bundle 16. Each end of the flat cable bundle 16 is connected to a connector jack 20. In the intermediate portion between the two ends, the multiple cables are bundled in a substantially round shape and covered with a resin sheath 22. Spiral tubes 24 are provided where needed over the round portion of the cable bundle 16 to improve resistance to abrasion. The individual flat coaxial cables illustratively have a cross-section of 1 mm × 1 mm each.

Figure 5:
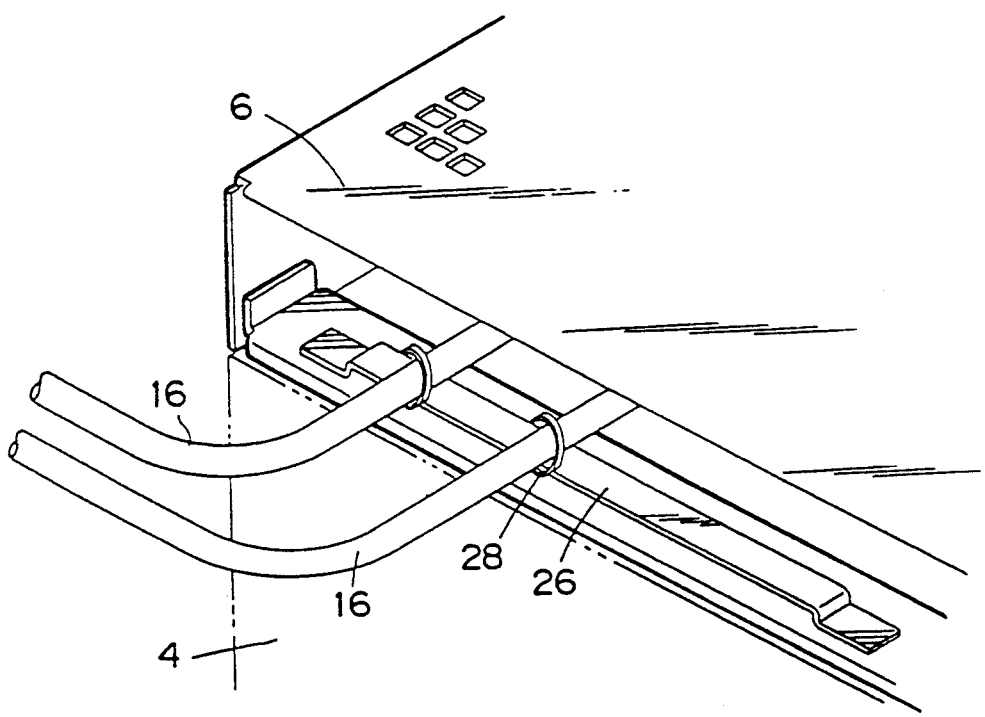
FIG. 5 is a rear perspective view of a cable accommodation tray included in the embodiment.

FIG. 5 is a rear perspective view of the cable accommodation tray 6. A cable holder 26 is fixed to the cable accommodation tray 6. Each flat coaxial cable bundle 16 is fixed to the cable holder 26 with a fixing band 28.

Figure 6:
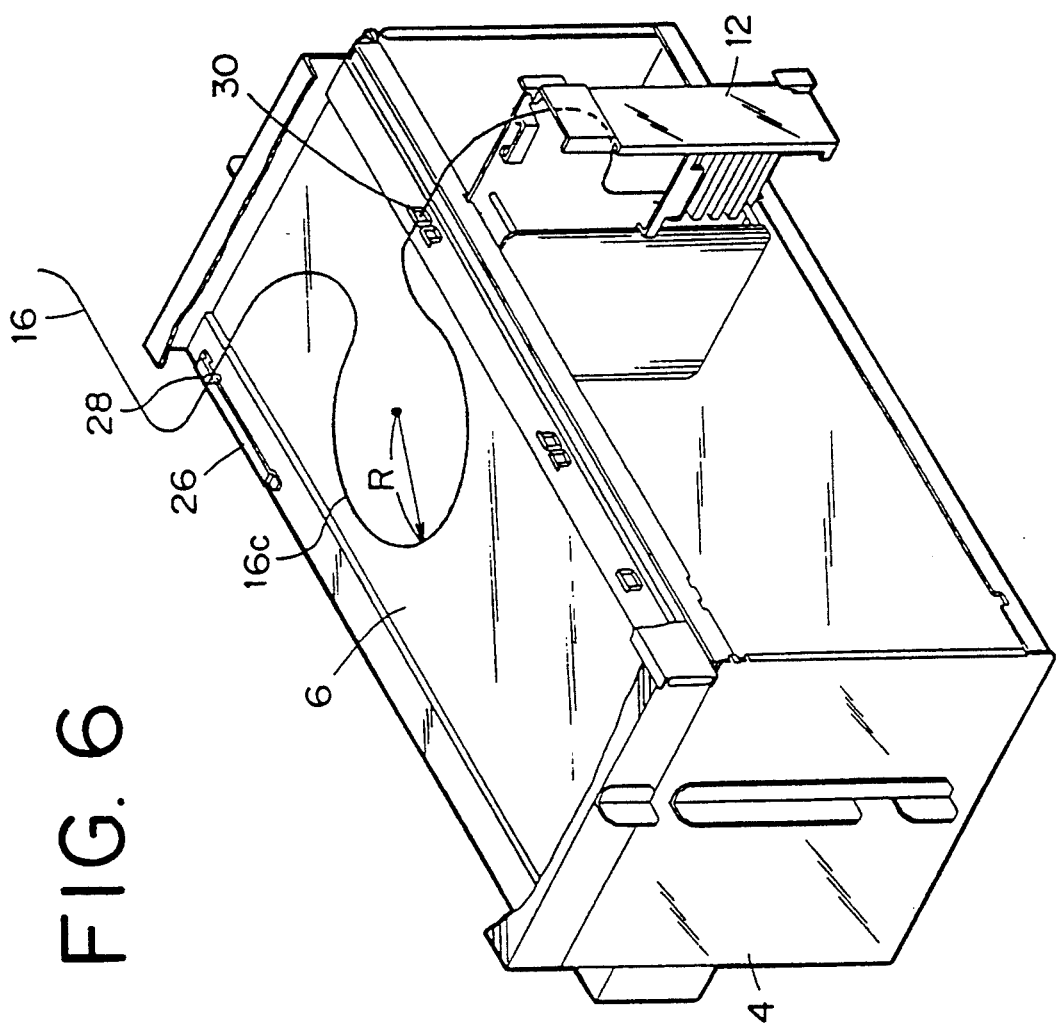
FIG. 6 is a perspective view of a base shelf and a cable accommodation tray placed on top thereof as part of the embodiment.

As depicted in FIG. 6, the extra length portion 16c of each flat coaxial cable bundle 16 is accommodated in the cable accommodation tray 6. Each flat coaxial cable bundle 16 is fixed to the base PWB assembly 12 using the fixing band 28 so that the base PWB assembly 12 will be drawn out in the forward direction with a sufficient length of the bundle 16 left in the tray 6. The cable accommodation tray 6 is separated from the base shelf 4. This is to allow the size of the cable accommodation tray 6 to be adjusted in accordance with the number of flat coaxial cable bundles 16 installed.

Each flat coaxial cable bundle 16 is fixed to the rear of the cable accommodation tray 6 using the fixing band 28. With the extra length portion 16c contained in the cable accommodation tray 6, the flat coaxial cable bundle 16 passes through the cable guidance band 30 to connect to the base PWB assembly 12. The radius of curvature R for the extra length portion 16c of the flat coaxial cable bundle 16 is set to be at least five times the diameter of the bundle 16. Preferably, the extra length portion 16c of the flat coaxial cable bundle 16 is about half a single turn based on the above radius so that the base PWB assembly 12 will be inserted and extracted smoothly.

Figure 7:
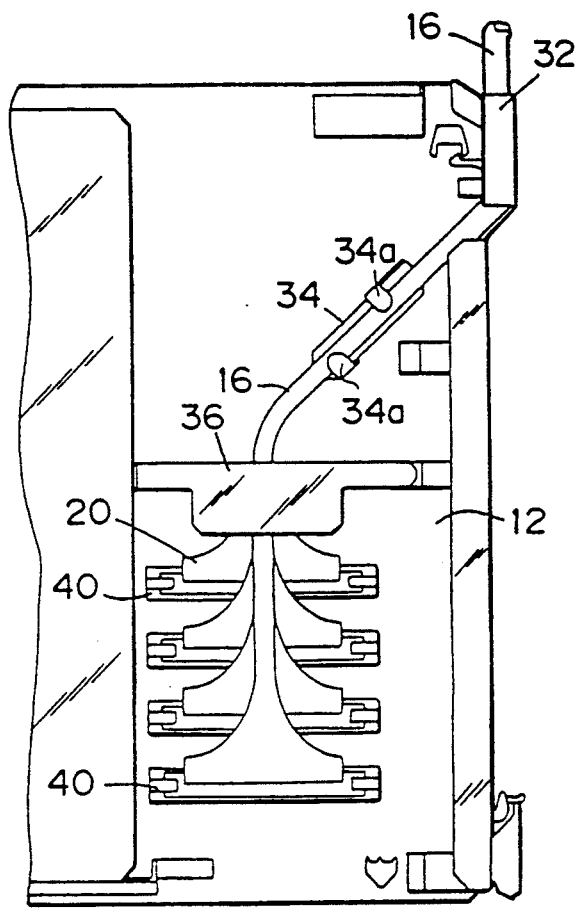
FIG. 7 is a side view of a cable entry and connection portion for ,base PWB assemblies as part of the embodiment.
Figure 8:
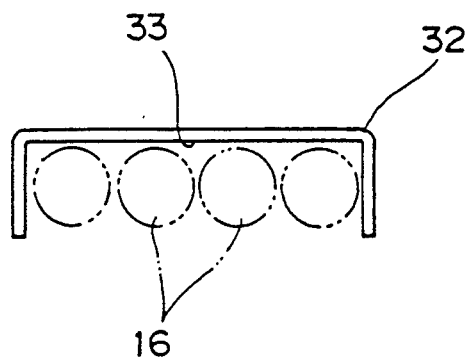
FIG. 8 is a plan view of a cable entry port as part of the embodiment.

FIG. 7 is a side view of a cable entry and connection portion for the base PWB assemblies 12. A plurality of flat coaxial cable bundles 16 that have passed through the cable guidance band 30 enter a cable entry port 33 formed by a guidance member 32 and attached to the front top the base PWB assemblies 12. FIG. 8 is a plan view of the cable entry port 33. With this embodiment, four flat coaxial cable bundles 16 enter the cable entry port 33. The crosswise dimension of the base PWB assemblies 12 is determined by the area of the cable entry port 33 accommodating a plurality of flat coaxial cable bundles 16. This means that to enhance the installation density of base PWB assemblies 12 requires using flat coaxial cables of smaller diameters.

Figure 9:
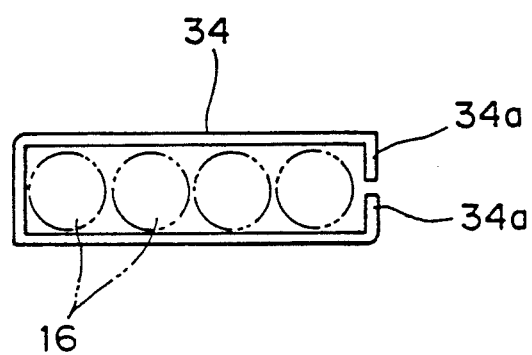
FIG. 9 is a plan view of a cable fixture as part of the embodiment.

A cable fixture 34 (in FIG. 9) is attached obliquely to each base PWB assembly 12. The cable fixture 34 is attached so that when the base PWB assembly 12 is inserted sufficiently deep into the base shelf 4, the radius of curvature for the flat coaxial cable bundle 16 as constrained by the cable fixture 34 will be at least five times the diameter of the bundle 16, the center of the radius being the cable guidance band 30.

Figure 10:
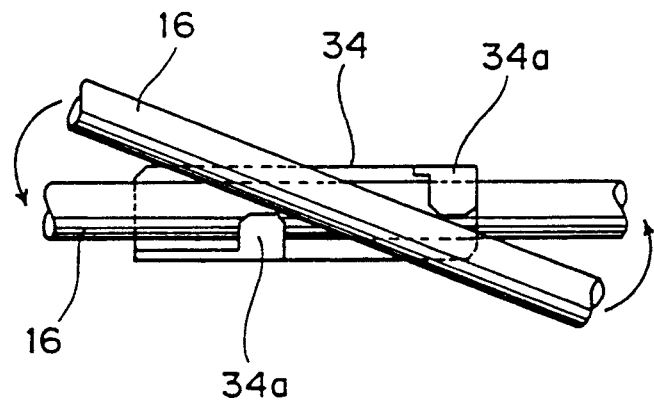
FIG. 10 is a view showing how to fasten a flat coaxial cable bundle in connection with the embodiment.

FIG. 10 illustrates how to fasten flat coaxial cable bundles 16. The cable fixture 34 integrally comprises a pair of pawls 34a to fasten the flat coaxial cable bundles 16. The pawls 34a are formed in a staggered manner to hold the cable bundles 16 securely in the cable fixture 34. During cable installation work, the flat coaxial cable bundles 16 is first inserted between the pawls 34a as indicated. Turning the bundle 16 by about 45 degrees in the arrowed direction places it snugly into the cable fixture 34. To remove the cable bundle 16 involves simply turning it by about 45 degrees in the opposite direction away from the pawls 34a.

Referring again to FIG. 7, a cable holding member 36 is attached to the middle front of the base PWB assembly 12. The cable holding member 36 prevents the multiple flat coaxial cable bundles 16 from projecting in the direction of the adjacent base PWB assembly 12. A plurality of connector plugs 40 are attached parallelly to the lower front of the base PWB assembly 12. The connector plugs 40 are of a straight type such as to maximize the packing density of the electronic components on the PWB. The connector jacks 20 of the flat coaxial cable bundles 16 are connected from the top downwards to the respective connector plugs 40.

Figure 11:
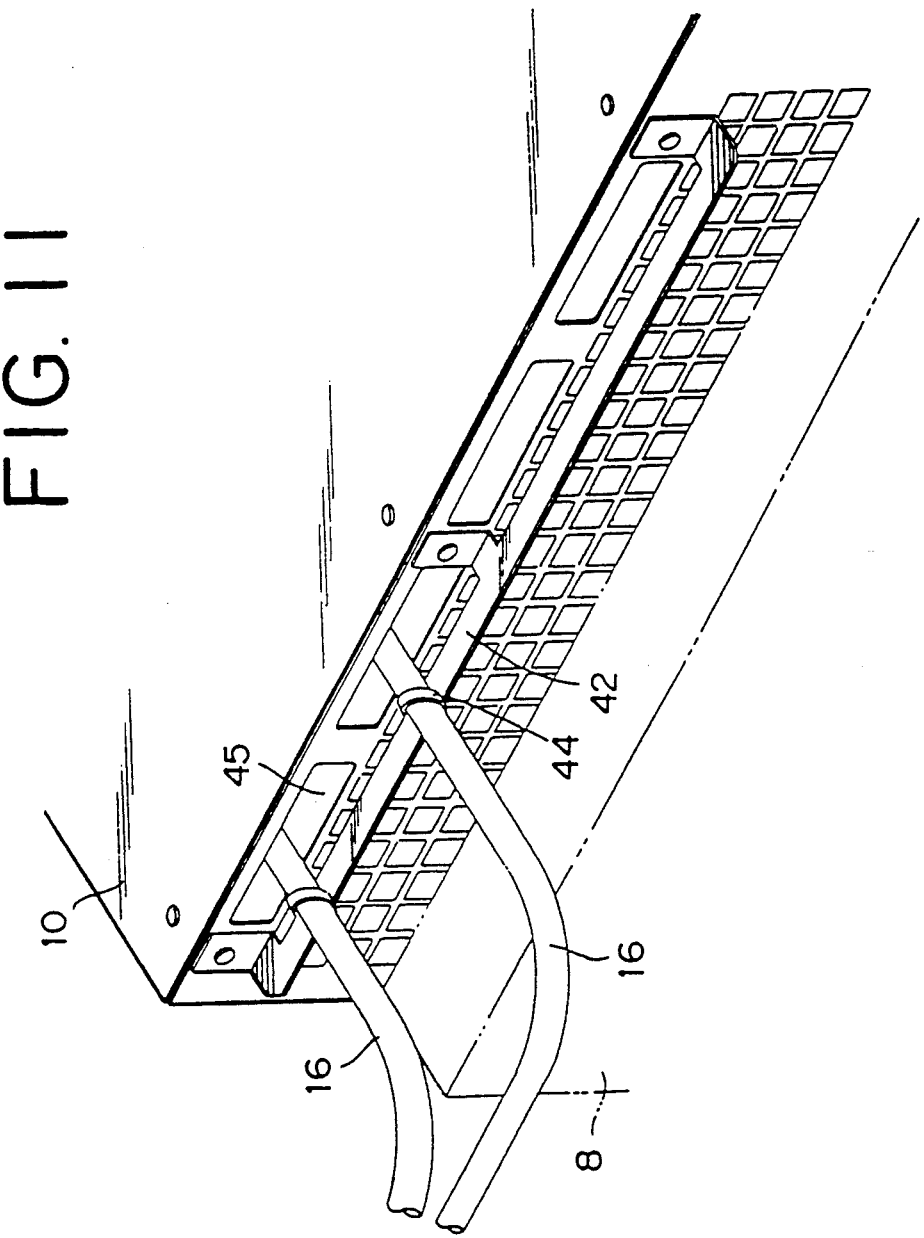
FIG. 11 is a rear perspective view of an extension shelf included in the embodiment.

FIG. 11 is a rear perspective view of an extension shelf included in the embodiment. For the ease of extension work, the extension shelf 8 has at its top a cable accommodation tray 10 furnished in an integral manner. A cable holder 42 is fixed to the cable accommodation tray 10. Flat coaxial cable bundles 16 are fastened to the cable holder 42 by use of fixing bands 44. A plurality of cable entry windows 45 are provided to let a plurality of flat coaxial cable bundles 16 enter the cable accommodation tray 10 in neat order. Each flat coaxial cable bundle 16 is fixed in such a manner as to leave an extra portion long enough to allow the extension PWB assembly 14 to be drawn out in an unconstrained manner in the forward direction.

Figure 12:
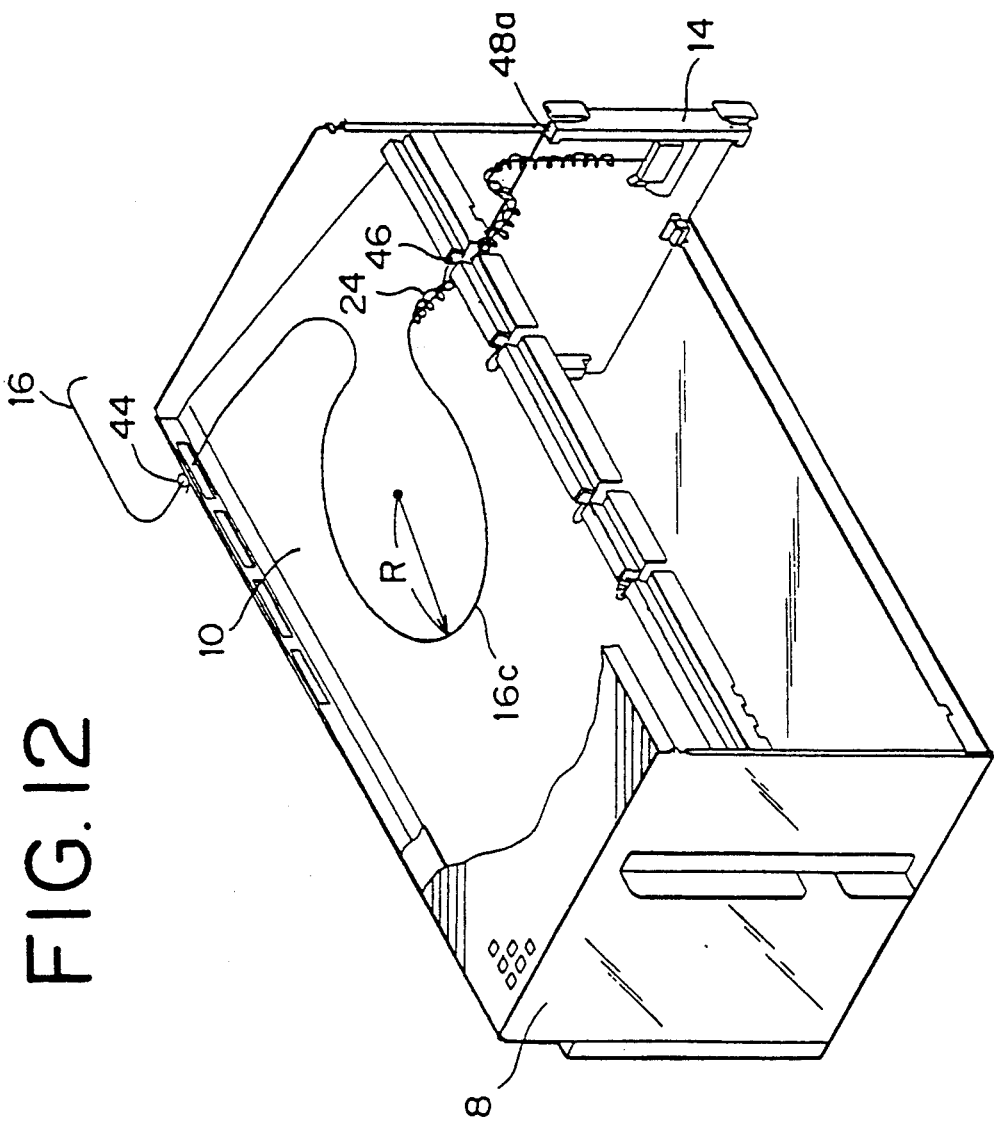
FIG. 12 is a perspective view of the extension shelf.

Referring now to FIG. 12, the flat coaxial cable bundle 16 is fastened with the fixing band 44 to the rear of the cable accommodation tray 10. The extra length portion 16c of the bundle 16 is contained inside the cable accommodation tray 10. The radius of curvature R for the extra length portion 16c of the flat coaxial cable bundle 16 used with the extension PWB assembly 14 is the same as that with the base PWB assembly 12. Preferably, the extra length portion 16c of the cable bundle 16 in the cable accommodation tray 10 is about half a single turn based on the above radius so that the extension PWB assembly 14 will be inserted and extracted smoothly.

A plurality of cable passage cutouts 46 are provided at the front of the cable accommodation tray 10. These cutouts 46 are approximately of a U-shape each, cutting into the bottom place of the cable accommodation tray 10 and into the top plate of the extension shelf 8. The cut surfaces of the cutouts 46 are finished smoothly so as not to damage the flat coaxial cable bundles 16 passing therethrough. The cable bundles 16 are further protected by the spiral tubes 24 from abrasion with the cable passage cutouts 46. The radius of curvature for the extra length portion 16c of each flat coaxial cable bundle 16 in the cable accommodation tray 10 is set to be at least five times the diameter of the bundle 16.

Figure 13:
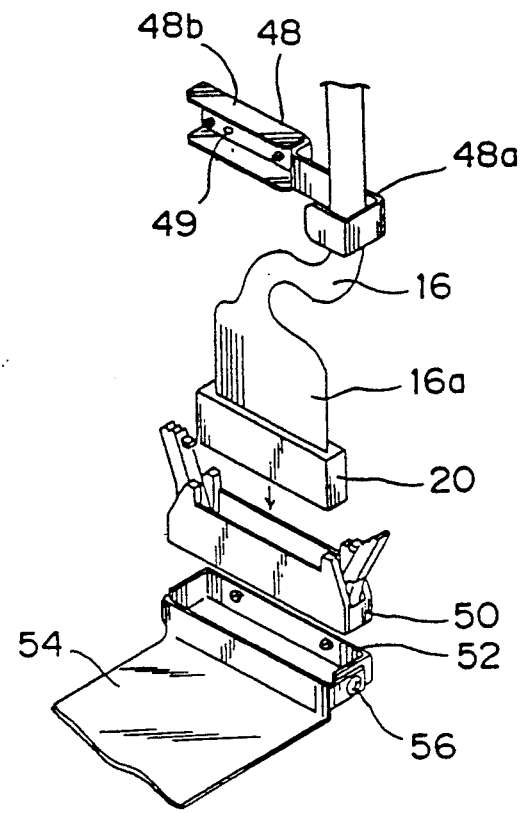
FIG. 13 is a perspective view of a cable entry and connection portion for extension PWB assemblies as part of the embodiment.

As shown clearly in FIG. 13, the flat coaxial cable bundle 16 past the cable passage cutout 46 extends downward guided by a cable guide 48a of a cable fixing and guiding member 48. The cable fixing and guiding member 48 is attached to each extension PWB assembly 14. The connector jack 20 of the downward-extending flat coaxial cable bundle 16 plugs into a connector plug 50 of the extension PWB assembly 14. Preferably, the connector plug 50 is of an L-angle type so that the crosswise dimension of the extension PWB assembly 14 will be minimized.

Under the connector plug 50 is fixed a member 52 to which a cable holding member 54 is pivotably attached using screws 56. With the connector jack 20 plugged into the connector plug 50, the cable holding member 54 is rotated clockwise so that a setscrew 58 furnished in the upper part of the member 54 may be screwed into a tapped hole 49 on a fixing portion 48b of the cable fixing and guiding member 48. This structure prevents the flat coaxial cable bundle 16 from getting dislodged sideways.

Figure 14:
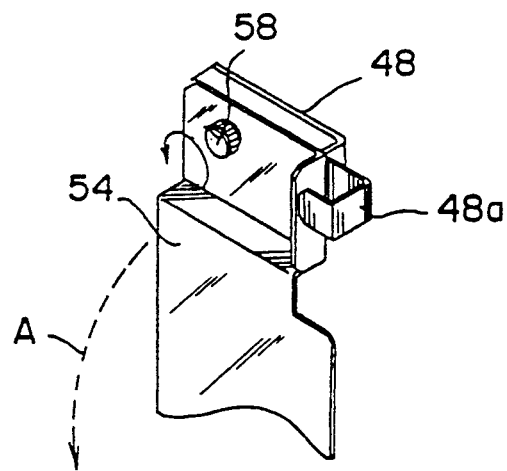
FIG. 14 is a view depicting how to fasten the flat coaxial c using cable fixing member.

To unfasten the cable holding member 54 involves, as depicted in FIG. 14, first rotating the setscrew 58 counterclockwise for disengagement from the tapped hole 59 and then letting the cable holding member 54 fall in the arrowed direction A.

Figure 15:
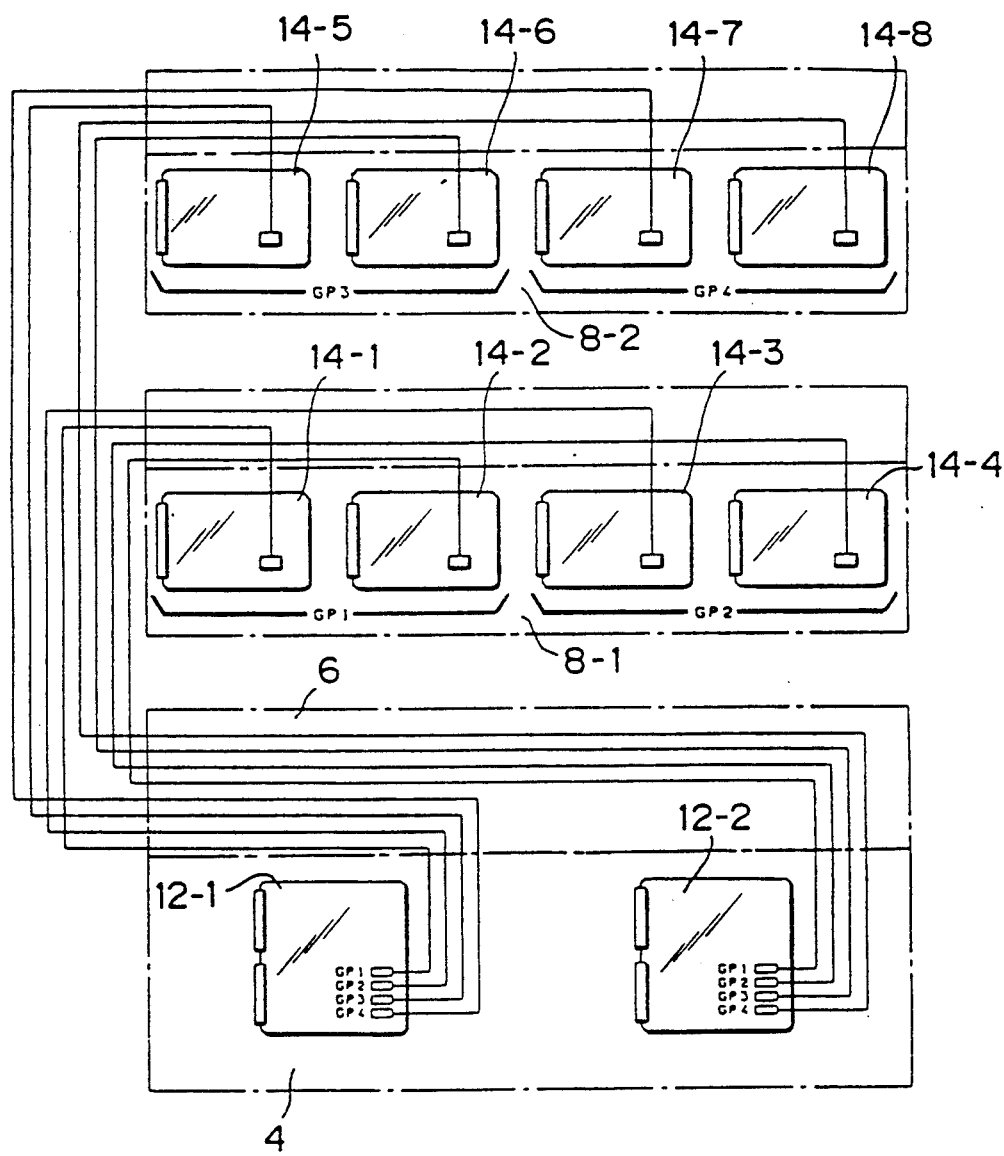
FIG. 15 is a view indicating how the embodiment is typically installed.

Described below with reference to FIG. 15 is how to connect a base PWB assembly with extension PWB assemblies according to the invention. Suppose that a base PWB assembly 12-1 on the base shelf 4 is connected to extension PWB assemblies 14-1 and 14-3 on an extension shelf 8-1, the assemblies currently operating. Where it is desired to add optical circuit channels to the above state, an additional base PWB assembly 12-2 on the base shelf 4 is connected illustratively to a newly installed extension shelf 8-2 using flat coaxial cable bundles. This allows extension work to be carried out without communication circuit disconnection.

Channel interface changes are performed as follows. With today's communication equipment, it is customary to have a redundant duplex PWB assembly configuration constituting a main signal system. That is, an operating PWB assembly is taken over automatically in case of failure by a standby PWB assembly. On the extension shelf 8-2 shown in FIG. 15, it is assumed that assemblies 14-5 and 14-7 are currently operating PWB assemblies and assemblies 14-6 and 14-8 are standby PWB assemblies.

There may be a case in which the channel interface of the above-mentioned PWB assemblies on the extension shelf 8-2 needs to be replaced with a different channel interface. In that case, the standby PWB assemblies 14-6 and 14-8 not currently active with signals are replaced first. Then the operating PWB assemblies 14-5 and 14-7 are switched manually to route the signals to the standby PWB assemblies 14-6 and 14-8. Thereafter, the operating PWB assemblies 14-5 and 14-7 are replaced. In this manner, the channel interface may be changed easily without causing communication circuit disconnection.

As many apparent different embodiments of this invention may be made without departing from the spirit and scope thereof, it is to be understood that the invention is not limited to the specific embodiments thereof except as defined in the appended claims.

What is claimed is:

1. A communication equipment extension system comprising:
   a rack;
   a base shelf mounted on said rack, said base shelf having a plurality of base printed wiring board assemblies installed perpendicularly and in parallel with one another;
   a first tray mounted on said rack above said base shelf;
   at least one extension shelf mounted on said rack above said first tray, said extension shelf having a plurality of extension printed wiring board assemblies installed perpendicularly and in parallel with one another;

a second tray fixed integrally at the top of said extension shelf; and a flat coaxial cable bundle connected detachably to the front side of each of said base printed wiring board assemblies, said flat coaxial cable bundle threading through said first tray from front to back to enter said second tray from the back thereof, extra length portions of said flat coaxial cable bundle being accommodated inside said first tray and said second tray, said flat coaxial cable bundle leaving the front end of said second tray to connect detachably to the front side of each of said extension printed wiring board assemblies.

2. A communication equipment extension system according to claim 1, wherein said flat coaxial cable bundle comprises a plurality of flat coaxial cables bundled in a flat shape at both ends of the cables and in a round shape in the intermediate portion between said both ends.

3. A communication equipment extension system according to claim 2, further comprising:

first cable fixing means for fixing said flat coaxial cable bundle to the back side of said first tray; and a cable guidance band fixed to the front side of said first tray so that said flat coaxial cable bundle threads through said cable guidance band.

4. A communication equipment extension system according to claim 3, further comprising:

second cable fixing means attached to said base printed wiring board assemblies; and cable holding means attached to said base printed wiring board assemblies for holding said flat coaxial cable bundle onto said base printed wiring board assemblies;

wherein the radius of curvature of said flat coaxial cable bundle is restricted by said second cable fixing means and by said cable guidance band.

5. A communication equipment extension system according to claim 2, wherein said second tray comprises:

third cable fixing means for fixing said flat coaxial cable bundle to the back side of said second tray;

a plurality of cable entry windows furnished at the back of said second tray; and a plurality of cable threading cutouts provided at the front of said second tray.

6. A communication equipment extension system according to claim 5, wherein each of said extension printed wiring board assemblies comprises:

cable guiding means furnished in alignment with and in front of said cable threading cutout; and cable holding means for holding said flat coaxial cable bundle, said cable holding means having one end attached rotatably to each of said extension printed wiring board assemblies and the other end fixed detachably to each of said extension printed wiring board assemblies.

* * * * *